Patented Aug. 1, 1933

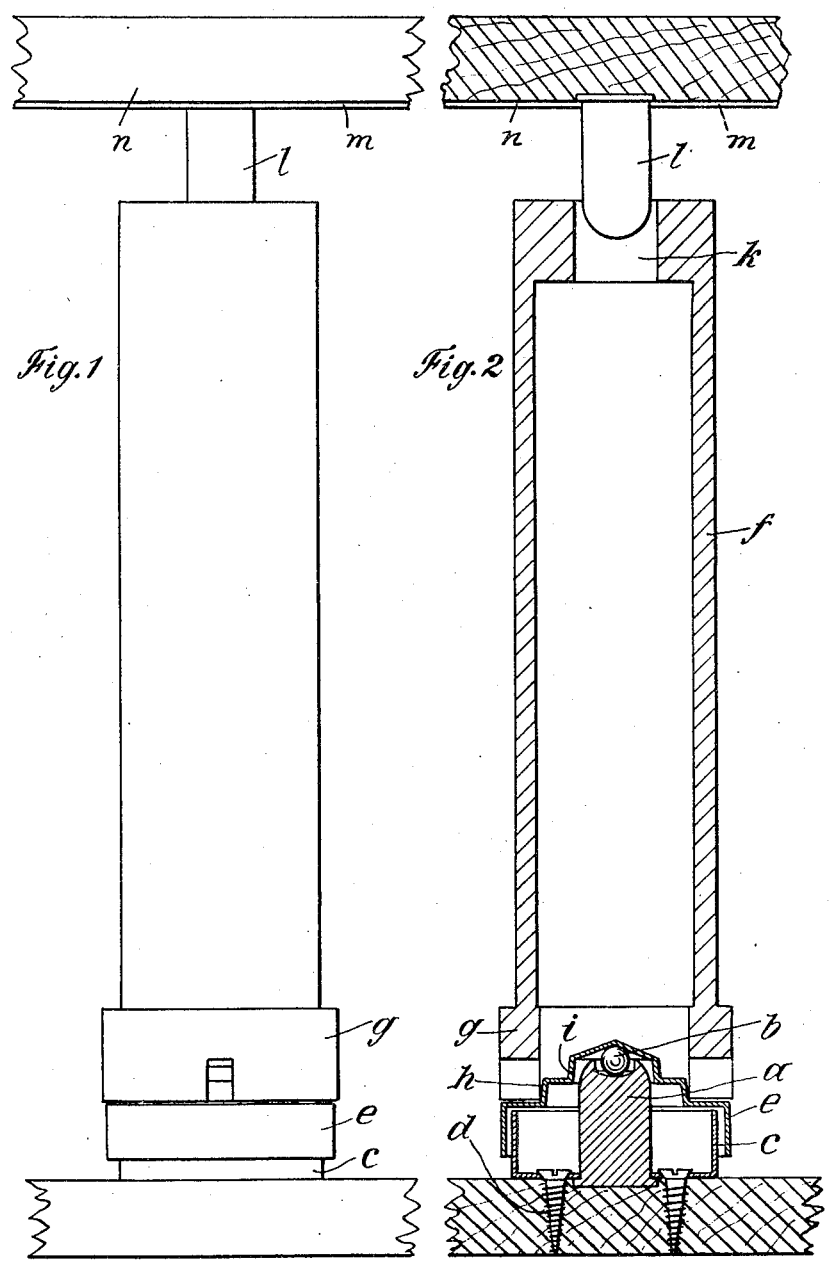

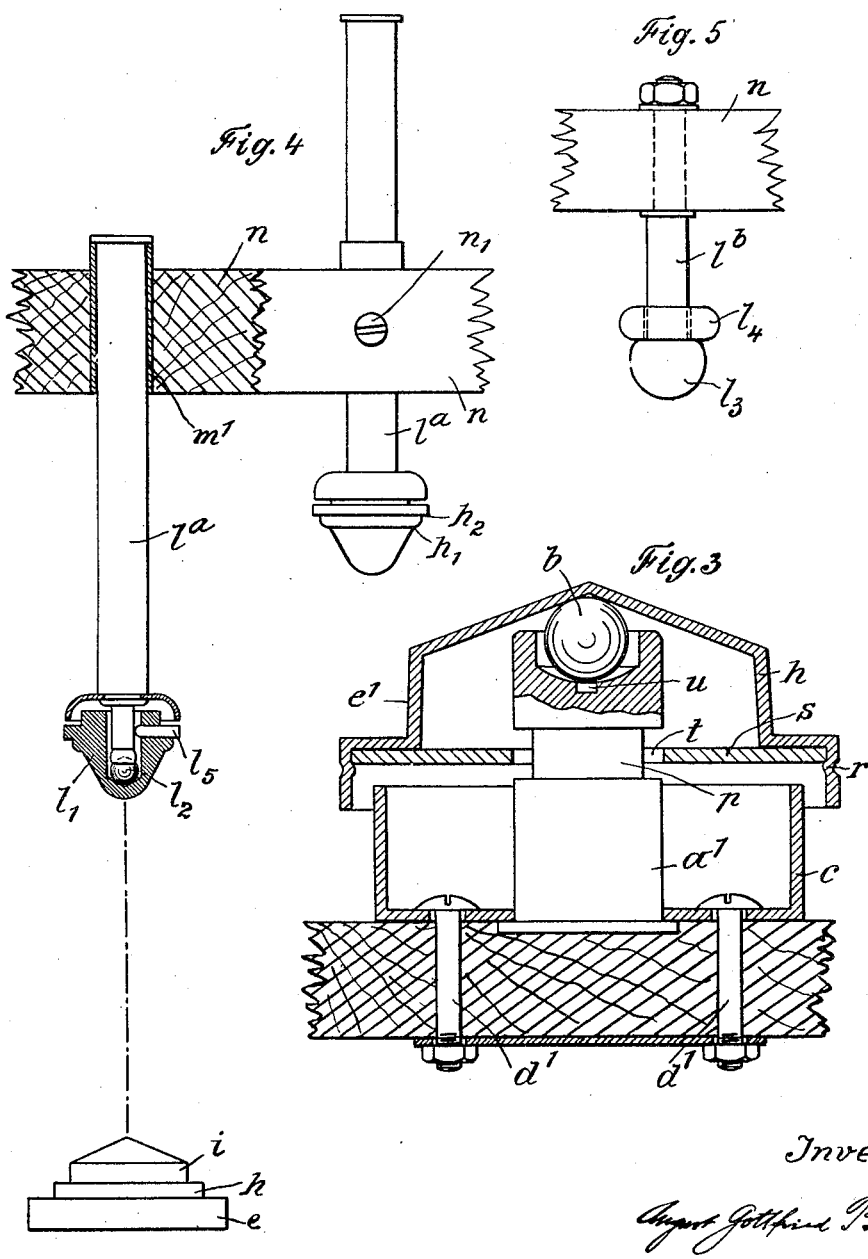

1,920,546

UNITED STATES PATENT OFFICE 1,920,546

BEARING SUPPORT

August Gottfried Brunner, Plauen, Germany

Application January 13, 1931, Serial No. 508,467, and in Germany February 7, 1930

7 Claims. (Cl. 308—228)

This invention relates to a bearing support for the vertical spools which deliver the roving in spinning machines whether of a continuous or intermittent type, and consists in the provision of a spool-supporting bell centred on a steel ball carried by an upright bolt, the upper end of the spool tube being engaged by a depending supporting bolt.

Fig. 1 of the accompanying drawings represents an elevation of a device according to the invention, Fig. 2 is a vertical section of the same, Fig. 3 is an enlarged vertical section of a supporting bell of different construction, Fig. 4 is a view, partly in section, showing a modified construction of the top support, and Fig. 5 is a view of a still further modified top support.

The spool tube $f$ is supported by means of its lower rim $g$ on a bell $e$ which is centred by means of its conical crown on a hardened steel ball $b$, the latter being accommodated in a cup formed in the upper end of an upright rigid bolt $a$. The bell surrounds a dust-excluding cup $c$ which is fastened together with the bolt $a$ to a supporting rail by means of screws $d$. The bell $e$ may be formed with a plurality of steps $i$ and $h$ whereon spool tubes $f$ of different diameters can be centred. The upper end of the spool tube is supported by a bolt $l$ which depends from a rail $n$ and which is secured to the latter by means of a plate $m$. Sufficient space is left between the rail $n$ and the spool tube to allow the latter to be raised on the bolt $l$ above the level of the bell $e$, and the tube aperture $k$ wherein the bolt $l$ engages, is large enough to enable the tube to be tilted on the bolt to clear the bell for a ready insertion and removal of the tubes. As an alternative, the plate $m$ may be divided into hingedly supported sections, one for each bolt $l$, enabling the bolts to be tilted together with the spool tube.

The upper supporting bolt may be fitted with a rotatable supporting element for the spool tube. Such an arrangement is shown in Fig. 4 wherein a cone $l^1$ is arranged to rotate about the reduced end of the bolt $l^a$ a steel ball $l^2$ being introduced in the cone for engagement with the end of the bolt. To prevent the cone from falling off when the spool tube is removed, the extreme end of the bolt may be formed with a head, and a retaining pin $l^5$ may be inserted into the cone for engagement with said head. The cone may be formed with steps $h^1$ and $h^2$ for centering spool tubes having apertures $k$ of different diameters.

The bolt $l^a$ may be axially adjustable in a sleeve $m^1$ in the rail $n$ and may be secured in different positions by means of a set screw $n^1$. On the other hand the bolt may be adapted to be raised in the sleeve for the removal and insertion of the spool tubes, in which case the latter are tilted together with the supporting bell for clearing the upper bolt after it has been raised. To prevent the bell, from tilting in this manner, from being lifted off its support by an adhering spool tube, the bell $e^1$ may, as shown in Fig. 3, be fitted with a bottom plate $s$ having an aperture $t$ of the same diameter as the supporting bolt $a^1$. The latter is formed, opposite the plate $s$, with a neck $p$ which allows the plate and bell to be tilted but which prevents the plate from leaving the neck $p$ when it is tilted for the removal of the spool tube. Without the spool tube, and when maintained in a properly centred and vertical position, the bell can be lifted off its support for oiling and cleaning the latter. The plate $s$ is placed against a shoulder in the bell and secured in position by a bead $r$ which is pressed in from the wall of the bell. The dust-excluding cup $c$ and the bolt $a^1$ are secured to the supporting rail by means of screw bolts $d^1$.

Even when used in co-operation with a rigid upper supporting bolt, the bell $e^1$ will function so as to prevent normally its removal from the support, since a very small lateral displacement of the bell will prevent the plate $s$ from leaving the neck $p$ and since the spool can hardly, unless it is intentionally kept straight, be removed without such displacement.

The cup for the steel ball $b$ may, as shown in Fig. 3, be formed with a cylindrical or conical recess $u$ to form a more or less large circular bearing surface for the ball. By this arrangement the ball will be braked and the spool will be prevented from overthrow, causing a regular stretching of the roving and uneven yarn, when the device is used on intermittently moving machines.

Fig. 5 shows a further modification of the upper supporting bolt. The bolt $l^b$ is in this case rigidly secured to the rail $n$ and provided with a head $l^3$ whereby it supports spool tubes having a small aperture. In addition to this head the bolt is fitted with a collar $l^4$ for supporting spool tubes having larger apertures. The collar $l^4$ is arranged to slide on the bolt in order to allow the tube with the smaller aperture to be raised on the bolt for removal and insertion.

I claim:

1. A bearing support for vertical delivery spools in spinning machines, comprising a supporting bell provided with centering steps for the lower end of the spool tube, an upright supporting bolt for said bell, a steel ball arranged in a cup in said bolt and adapted to take the thrust of and centre the bell, and a depending bolt adapted to engage in and support the upper end of the spool tube, said depending bolt allowing axial displacement and tilting of the spool tube for the detachment of the latter from the supporting bell.

2. A device as claimed in claim 1 wherein the bell is fitted with a bottom plate having an aperture of the same diameter as the respective supporting bolt and wherein said bolt is formed, opposite the plate, with a neck allowing the plate and bell to tilt and adapted to prevent a removal of the bell from the bolt except when maintained in a properly centred and vertical position.

3. A device as claimed in claim 1 wherein the ball cup is recessed to form a circular bearing surface for the ball.

4. The device claimed in claim 1 in combination with a spool supporting cone arranged to rotate about the upper bolt and fitted with a steel ball whereby it bears against the end of the latter, a head on the bolt, and a pin inserted in the cone for retaining the latter on the bolt by engagement with said head.

5. A device as claimed in claim 1 wherein the depending bolt is adapted for axial displacement.

6. A device as claimed in claim 1 wherein the depending bolt is adapted for axial displacement, and a spool supporting cone fitted rotatably at the end of the depending bolt and formed with steps for supporting spool tubes of different internal diameters.

7. A device as claimed in claim 1 wherein the depending bolt is formed with a head for engagement with spool tubes of small internal diameter and with a collar for engagement with spool tubes of larger diameter, said collar being arranged to slide on the bolt.

AUGUST GOTTFRIED BRUNNER.